(12) United States Patent
Geneste

(10) Patent No.: US 8,939,396 B2
(45) Date of Patent: Jan. 27, 2015

(54) HIGH-ALTITUDE, AERIAL NETWORK FOR THE PRODUCTION AND DISTRIBUTION OF LIQUID-HYDROGEN

(75) Inventor: Jean-François Geneste, Toulouse (FR)

(73) Assignee: Astrium SAS, Paris (FR)

( * ) Notice: Subject to any disclaimer, the term of this patent is extended or adjusted under 35 U.S.C. 154(b) by 355 days.

(21) Appl. No.: 13/376,474

(22) PCT Filed: Jun. 21, 2010

(86) PCT No.: PCT/FR2010/051257
§ 371 (c)(1),
(2), (4) Date: Dec. 6, 2011

(87) PCT Pub. No.: WO2011/001064
PCT Pub. Date: Jan. 6, 2011

(65) Prior Publication Data
US 2012/0073682 A1    Mar. 29, 2012

(30) Foreign Application Priority Data

Jun. 29, 2009    (FR) ...................................... 09 03141

(51) Int. Cl.
*B64B 1/40*    (2006.01)
*B64B 1/58*    (2006.01)
*F41J 9/08*    (2006.01)
(Continued)

(52) U.S. Cl.
CPC . *F17C 6/00* (2013.01); *B64D 39/00* (2013.01); *B64B 1/40* (2013.01); *F17C 2205/0142* (2013.01); *F17C 2221/012* (2013.01); *F17C 2223/0161* (2013.01); *F17C 2223/033* (2013.01); *F17C 2223/046* (2013.01); *F17C 2225/0161* (2013.01); *F17C 2225/033* (2013.01); *F17C 2225/046* (2013.01); *F17C 2227/0121* (2013.01); *F17C 2260/044* (2013.01); *F17C 2265/065* (2013.01); *F17C 2270/0189* (2013.01); *F17C 2270/0192* (2013.01); *Y02E 60/321* (2013.01); *Y02E 60/36* (2013.01)
USPC ............................................... 244/31; 244/33

(58) Field of Classification Search
USPC .............................. 244/24, 30, 31, 33, 96, 97
See application file for complete search history.

(56) References Cited

U.S. PATENT DOCUMENTS 3,834,655 A * 9/1974 Crosby, Jr. ................. 244/135 R
4,055,316 A * 10/1977 Chipper et al. ................. 244/33
(Continued)

FOREIGN PATENT DOCUMENTS

WO    WO 95/16170 A1    6/1995

OTHER PUBLICATIONS

International Search Report completed Aug. 9, 2010 and mailed Aug. 17, 2010 from corresponding International Application No. PCT/FR2010/051257 filed Jun. 21, 2010 (2 pages).
(Continued)

*Primary Examiner* — Tien Dinh
*Assistant Examiner* — Michael A Fabula
(74) *Attorney, Agent, or Firm* — Klein, O'Neill & Singh, LLP

(57) ABSTRACT

A system includes a plurality of liquid-hydrogen-producing balloon stations that form a total network for distributing liquid hydrogen, and said balloon stations in the network are positioned at the nearest of said target areas of use, substantially above the latter, such that the transfer of the liquid hydrogen between said production balloon stations and said target areas of use is minimal.

20 Claims, 2 Drawing Sheets

(51) Int. Cl.
*F17C 6/00* (2006.01)
*B64D 39/00* (2006.01)

(56) References Cited

U.S. PATENT DOCUMENTS

| | | | | |
|---|---|---|---|---|
| 4,335,093 A | * | 6/1982 | Salomon | 423/644 |
| 4,995,572 A | * | 2/1991 | Piasecki | 244/2 |
| 5,348,254 A | * | 9/1994 | Nakada | 244/97 |
| 6,224,015 B1 | * | 5/2001 | Reinhard | 244/24 |
| 7,249,733 B2 | * | 7/2007 | Palmer | 244/30 |
| 8,083,174 B2 | * | 12/2011 | Lee | 244/30 |
| 8,336,810 B2 | * | 12/2012 | Brutoco | 244/30 |
| 8,820,681 B2 | * | 9/2014 | Brutoco | 244/115 |
| 2006/0000945 A1 | * | 1/2006 | Voss | 244/97 |
| 2008/0048453 A1 | * | 2/2008 | Amick | 290/44 |
| 2008/0053094 A1 | * | 3/2008 | Palmer | 60/641.8 |
| 2009/0294576 A1 | * | 12/2009 | LaForge | 244/30 |
| 2009/0302149 A1 | * | 12/2009 | Fuchs et al. | 244/2 |
| 2010/0102164 A1 | * | 4/2010 | Brutoco | 244/30 |
| 2011/0315546 A1 | * | 12/2011 | Geneste | 204/262 |

OTHER PUBLICATIONS

Written Opinion completed Aug. 9, 2010 and mailed Aug. 17, 2010 from corresponding International Application No. PCT/FR2010/051257 filed Jun. 21, 2010 (11 pages).

* cited by examiner

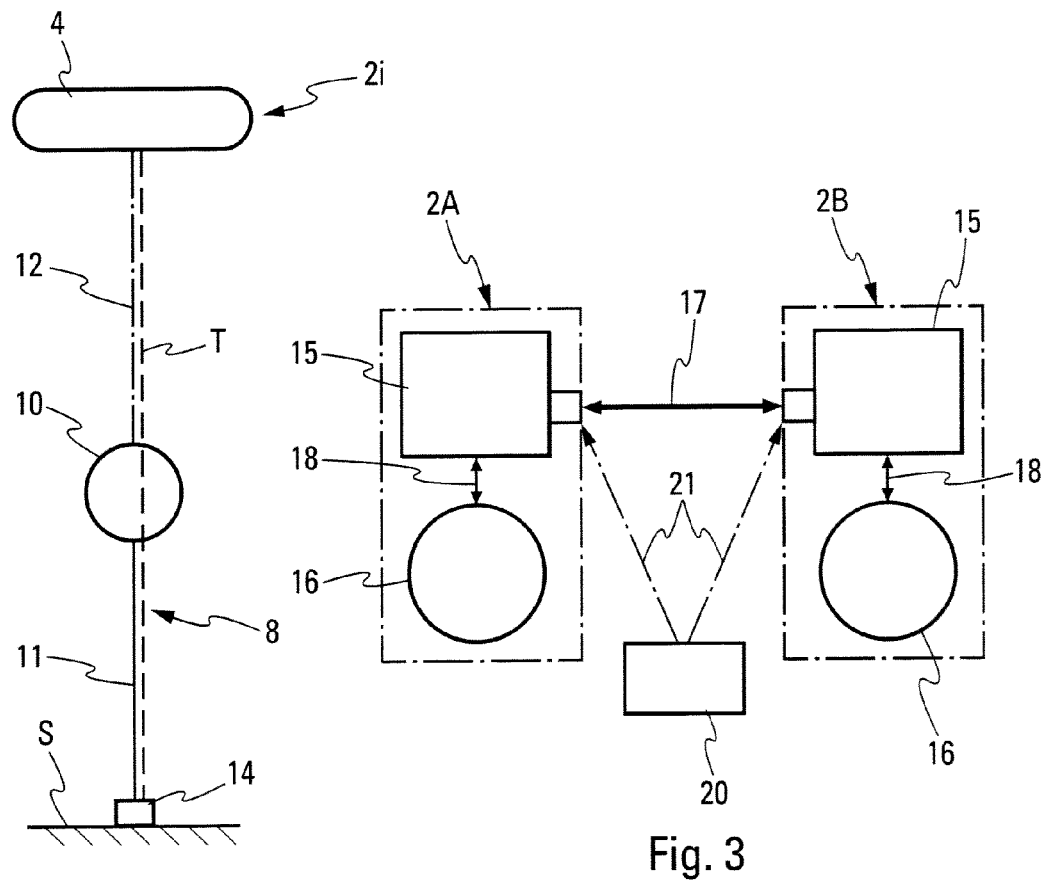
Fig. 2
Fig. 3
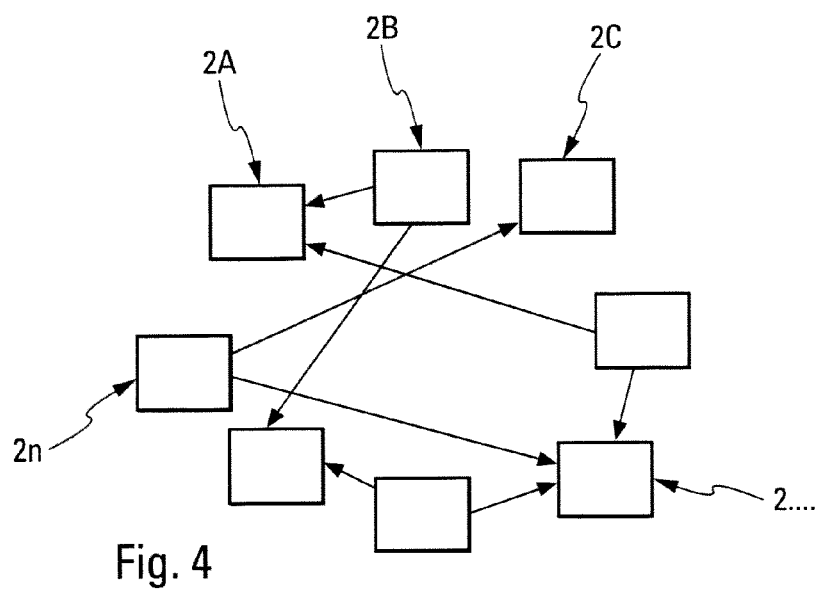
Fig. 4

HIGH-ALTITUDE, AERIAL NETWORK FOR THE PRODUCTION AND DISTRIBUTION OF LIQUID-HYDROGEN

CROSS-REFERENCE TO RELATED APPLICATIONS

This is a national phase application under 35 U.S.C. §371 of PCT Application No. PCT/FR2010/051257, filed Jun. 21, 2010, which claims the benefit of French application No. 09/03141 filed Jun. 29, 2009, the contents of each of which are expressly incorporated herein by reference.

FIELD OF ART

The present disclosure relates to a global system for distributing energy such as liquid hydrogen.

BACKGROUND

Contrary to the distribution of petroleum and gas making use of complex and comprehensive facilities (transportation via pipelines, via sea and road paths, refinery facilities, storage, etc.) from the production sites to any locations around the world, alternative energies are, as far as they are concerned, not provided with such distribution facilities, so that, to their cost, already little competitive with respect to that of petroleum, is added that of the distribution as such, hindering their development except when petroleum and gas prices reach very high thresholds.

Alternative energy sources include liquid hydrogen that, for instance, from document US2008/053094, one can produce, in a clean way in a balloon station being located in altitude on top of cloud layers and converting, through appropriate means, a water supply on board the balloon station into liquid hydrogen, and this from sun radiation.

SUMMARY

From such a balloon-station, the present method, system and device provide designing a global system for distribution energy, with no heavy and complex facilities such as those needed for the distribution of fossil energies.

To this end, the global system for distributing energy such as liquid hydrogen obtained and stored in a balloon station located in altitude, on top of cloud layers, and converting a water supply on board said balloon station into liquid hydrogen from sun radiation, is remarkable, according to the present method, system and device, in that it comprises a plurality of balloon stations for producing liquid hydrogen forming a global network for distributing liquid hydrogen to target areas for use of said liquid hydrogen, and in that said balloon stations in network are positioned as close as possible to said use target areas, substantially on top thereof, so that the transfer of liquid hydrogen between said production balloon stations and said use target areas is minimum.

Thus, as balloon stations for producing liquid hydrogen, arranged in network, are located in altitude on top of or at least close to the use target areas (whether they are stationary or mobile), implementing heavy, complex and expensive facilities on the ground is omitted, such as those used for fossil energies, for distributing liquid hydrogen produced by balloon stations. Designing such a distribution system without any usual distribution constraints, proves to be a significant advantage as only an appropriate array of balloon stations in network is necessary as a function of use target areas for covering the whole needs and supplying energy being, in addition, alternative and clean at a competitive cost.

Preferably, each balloon station carries a plurality of controllable flying bodies containing the liquid hydrogen being produced and having, as a mission, to reach said use target areas for supplying them. Such an array is particularly of interest in the preferred application, although not exclusive, of the present method, system and device to the management of an airplane fleet then operating with hydrogen as movable use target areas. Indeed, the hydrogen based distribution system according to the present method, system and device is much more efficient in energy terms than a kerosene system since the production location of the hydrogen is much closer to the airplanes to be supplied, and distribution facilities such as for petroleum are useless with hydrogen as just flying bodies, such as drones, are in charge of transporting liquid hydrogen by the gravity potential energy up to target areas.

These could be movable as above or stationary such as facilities for storing liquid hydrogen located in multiples points so as to form a proximity distribution network, and, to come back to the preferred application, in airports so as to refuel airplanes on the ground, so that with the present method, system and device a whole energy distributing system for managing on the ground and in the air, airplane fleets.

Naturally, such flying body balloon stations could also supply other stationary use target areas, located on the ground.

Furthermore, said balloon stations located in altitude could be free and autonomous, the various phases of climbing, descending and level flying of said balloon stations being provided by adjusting the variable volume of the balloons of said stations. This is of course preferred when said use target areas are movable, as the balloon stations can then be brought as close as possible to remarkable passage points of said movable areas (air traffic lanes of airplanes).

However, alternatively, said balloon stations located in altitude could be captive and connected to the ground by a controllable link advantageously arranged straight below the target area to be supplied, such as a then stationary area (ground facility, etc.).

In such a case, each link could comprise at least two wires assembled one after the other by means of an auxiliary balloon and connected, for the one, to the ground, for the other, to said balloon station. Such assembly via several wires allow to reach, with no difficulty, a significant altitude, all the more as the auxiliary balloons cancel the weight of the lower cable (s).

Advantageously, said network of balloon stations comprises several groups of n balloon stations located on top of said use target areas, at least one balloon station of one of said groups being able to migrate to another group as a function of needs and the number of flying bodies in each balloon station is variable, a function of the use target areas to be supplied. Thus, the network (number of groups, of balloon stations and of flying bodies) is adapted as a function of the demand, by being able to modulate their number, (addition, removal).

For example, when said target areas are movable, such as airplanes to be supplied with energy and operating with liquid hydrogen, the density of balloon stations in each flight phase of said airplanes, such as phases of climbing, level flying and descending, is uniform and, in each one of said flight phases, the densities of balloon stations are different. Thus, more balloon stations are available in the climbing phase of airplanes, where their consumption is maximum, than in their descending phase.

Furthermore, said balloon stations allotted to a use target area could be piloted by a computer system managing the resource of said balloon stations at the level of said target area and, advantageously, said computer management system of the resource is included in an air traffic management software. Thus, the journeys of airplanes, the positioning of said balloon stations, the choice of supplying flying bodies, etc. could be optimized as a function of current conditions.

According to another characteristic of the present method, system and device, when said stations are free and autonomous, each one of them comprises a master-slave computer to which a piloting-guiding equipment is connected, said master-slave computers communicating therebetween so that a defective computer of one of said balloon stations is replaced by an operational computer of any other balloon station. Thus, the space positioning of said balloon stations between the latter within a group is maintained.

For example, replacing said defective computer by an operational computer could be provided by a voting unit being able to be triggered remotely and allowing to switch from the defective computer to the other one neutralizing the data from the defective computer at destination of the corresponding equipment, while letting the data from the operational computer go through.

Preferably, said computers communicate therebetween and with said respective equipment via radiofrequency or optically and said voting units communicate with said computers via radiofrequency or optically.

Advantageously, each computer of said balloon stations has the computing ability needed for managing said balloon stations of a group.

According to another characteristic, said balloon stations of a group form therebetween a permanently connected communications graph, the intrinsic topology of said graph being optimized so as to cope with a link loss. Thus, it is sure that the balloon stations remain in a permanent contact, even if a breakdown occurs on one of them or if a geometric change of the group occurs.

BRIEF DESCRIPTION OF THE FIGURES

The FIGS. of the appended drawing will better explain how the present method, system and device can be implemented. In these FIGS., like reference numerals relate to like components

FIG. 2 schematically shows a balloon station of the captive type.

FIG. 3 shows a piloting architecture for two balloon stations.

FIG. 4 is a schematic embodiment of the telecommunications network between n balloon stations.

DETAILED DESCRIPTION

Figure 1:
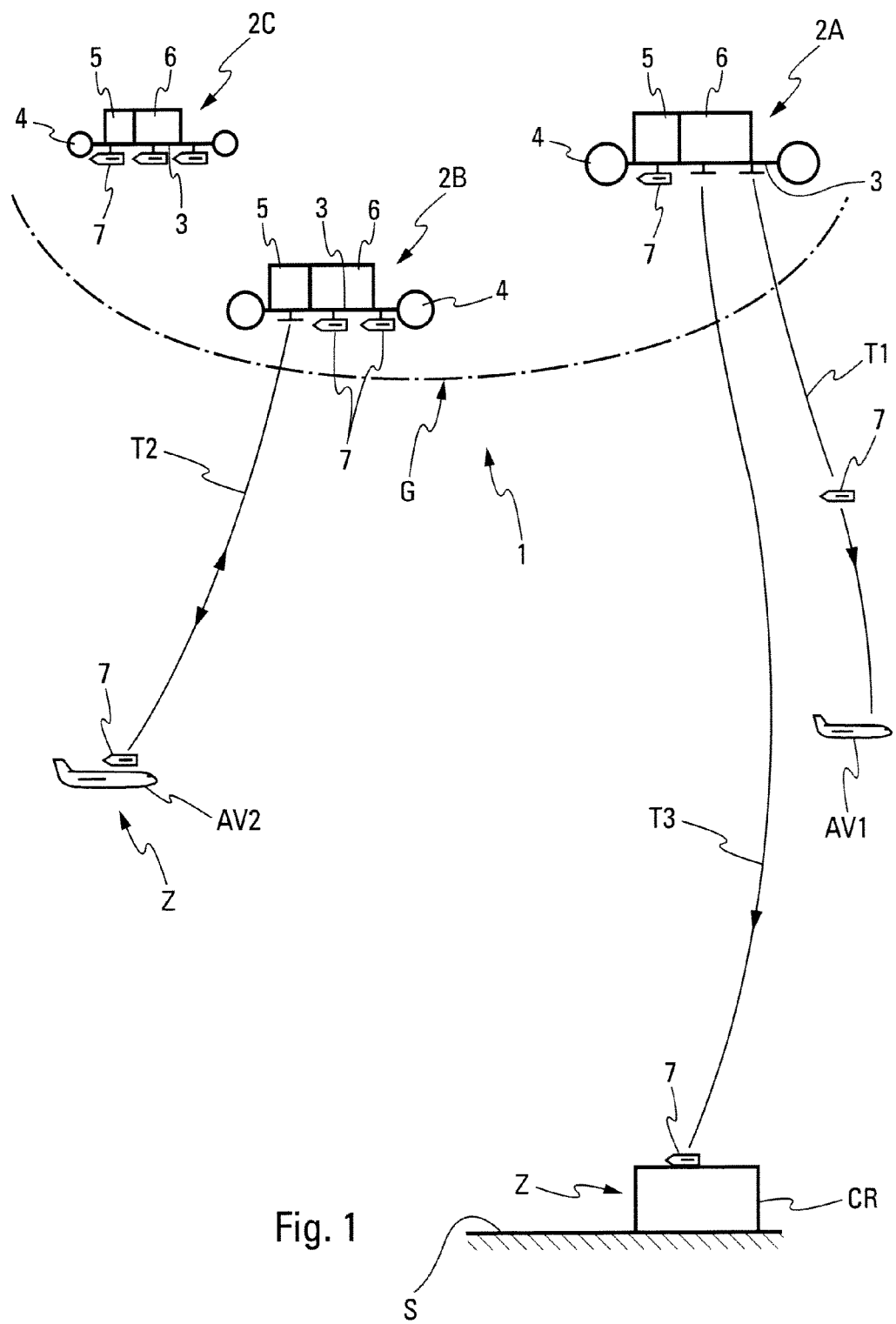
FIG. 1 shows a partial embodiment of a system for distributing liquid hydrogen produced by balloon stations of the autonomous type.

The liquid hydrogen distributing system 1, partially and schematically shown on FIG. 1, is adapted, in its preferred particular, although not exclusive application, for managing a fleet of airplanes, that is, for the flight refueling of airplanes as well as the filling of vessels or tanks with liquid hydrogen provided in the airports or similar sites for ground refueling airplanes. Thus, for this application, such a distribution system is global and independent.

To this end, the system 1 comprises a plurality of balloon stations for producing liquid hydrogen, only three of which are referenced 2A, 2B and 2C on FIG. 1. They are located in altitude on top of cloud layers, for example in the stratosphere, and then advantageously use the sun radiation for converting water, on board the balloon stations, into liquid hydrogen.

These balloon stations 2A, 2B, 2C, . . . , 2n for producing hydrogen are then arranged as a network for distributing the liquid hydrogen being produced toward use target areas Z such as, in said application, the airplanes AV1, AV2, . . . , AVm and the storage vessels-tanks CR of airports, so that they are arrayed in groups G or constellations on top of different target areas as a function of the needs, as will be explained later on, including as far as flight refueling of airplanes is concerned. Moreover, as balloon stations are located in high altitude, they are positioned on top of stationary (airports) or movable (airplanes) target areas in then predetermined points, so that the distance of transfer of liquid hydrogen is minimum.

More particularly, each of the balloon stations 2A, 2B, 2C, . . . , 2n being furthermore identical therebetween structurally and briefly comprises a platform 3 surrounded, in this example, by a balloon or a sustaining toric shell 4 with an adjustable variable volume for providing the different operating phases of the balloon station, that is its climbing, descending and level flying at the desired altitude. On such platform 3, there are provided a water supply 5 and a device 6 for converting water into its oxygen and hydrogen components from the sun radiation being received. This device 6 symbolized by a rectangle on FIG. 1 could be either of the direct type, through cracking, by a moving sun concentrator oriented toward the sun and spontaneously dissociating hydrogen and oxygen from water, or of the indirect type, through electrolysis, by a moving photoelectric generator oriented toward the sun and having in its focus a thermal engine. Under the platform 3 of each balloon station 2 flying bodies 7 are provided, such as drones, with their tanks containing the liquid hydrogen produced by the conversion device, and then liquefied, and that could be dropped controllably for reaching the use target areas Z.

FIG. 1 shows so-called free or autonomous balloon stations 2A, 2B, 2C because they are not connected to the ground S and are able to operate themselves, varying the adjustable gas volume contained in the toric balloons 4 and also controlling and if necessary attitude controlling engines, not shown, provided on the platform 3. The balloon stations of this type are particularly appropriate for supplying moving target areas although they could also be arranged on top of stationary target areas.

On the other hand, FIG. 2 shows a so-called captive balloon station 2i because it is connected to the ground S via a controllable link 8. The ground S could be the solid ground or a floating ground on the water (sea, . . . ) by means of an appropriate platform or barge. Thus, for reaching a high altitude (30 to 60 km), the link 8 comprises several cables assembled one after the other and having advantageously arranged therebetween auxiliary balloons 10. FIG. 2 shows one single auxiliary balloon 10 with which are associated, on one side, a lower cable 11 fastened to the ground S by means of a motorization 14 and, on the other side, an upper cable 12 (or n cables in a mixed line with other auxiliary balloons) connected to the platform 3 of the balloon station 2i. In view of the length of each link 8 that could be as high as 30 km and, thus, of the bulk thereof, each auxiliary balloon 10 will produce a thrust opposite to the weight vector of the cable so that, with these auxiliary balloons, such heights can be reached with no problem. Naturally, this captive type of balloon stations is particularly appropriate for supplying stationary target areas being positioned just on top of them. There too, the production of energy occurs in the vicinity of the consumption location or area (an airport in the preferred application)

and, thus, the energetic equation is better than that of kerosene or other petroleum derivatives.

Thus, for improving the resistance to the wind of the distribution system, the auxiliary balloons will be streamlined.

In order to fill the water supply 5 when the latter is exhausted, the relevant balloon station 2A, 2B, 2C, whether it is free with respect to the ground S (FIG. 1) or captive by one link 8 (FIG. 2), goes either completely down to the ground S acting on the adjustable volume of gas (hydrogen) of the toric balloon 4 or on the motorization 14 of the controllable link 8 so as to fill the supply 5 from a water surface (sea, lake, river, . . . ), or partially up to the cloudy areas of the atmosphere for trapping therein, by means of an appropriate system (net or other), the water droplets from the clouds and thereby fill the supply 5. In the case of captive balloon stations, a pipe T could be advantageously associated with the link 8, such as shown in broken line on FIG. 2, and wherein, from the ground S, steam under pressure could be injected for supplying the supply 5 with water.

The supply of moving and stationary target areas Z, schematically shown on FIG. 1, occurs as follows.

When one of the airplanes has to be refueled, such as the right hand airplane AV1, one of the drones 7 containing liquid hydrogen leaves, on command, the platform 3 of the balloon station 2A located the closest to the passage of the airplane AV1. To this end, the drone 7 goes gliding according to the arrow trajectory T1 toward the airplane AV1. An attitude control auxiliary engine could be turned on so as to reposition the drone if it deviates too much from the trajectory and/or finalize its approach and its connection with the airplane.

On the other hand, the airplane AV2 shown on the left on FIG. 1 is being refueled, the drone 7 having come, according to the trajectory T2, to the meeting point with the airplane through a usual pole connection or the like. When the liquid hydrogen supply is carried out, the drone 7 can go back to the platform 3 of the starting balloon station 2B according to the upward arrow of the trajectory T2, thanks to the auxiliary engine supplied by part of the liquid hydrogen remaining in its tank, or it could travel to a not shown receiving site, provided on the ground S.

An important advantage of the global distribution system 1 is that the airplanes AV1, AV2, . . . , AVm do not have to take off with a filled up fuel tank, so that they are lighter and consume less or then more freight could be taken on board. It should also be noticed that the notion of action range of airplanes becomes relative with the system of the present method, system and device in so far as an airplane, whatever its type and its motorization, will be able to cover large distances while being refueled several times.

Another tanker drone 7 of the balloon station 2A has furthermore left its platform 3 for reaching a tank vessel CR to be filled of an airport according to the trajectory T3. The tank vessel could be buried. While the balloon stations being shown are free, at least one of them could be captive.

Moreover, if positioning the network of balloon stations 2A, 2B, 2C, . . . , 2n, or groups G of balloon stations of the distribution system 1 of the present method, system and device, on top of stationary target areas, seems to be obvious as a function of the needs to be met, on the other hand, for the preferred application of the present method, system and device to the management of a fleet of airplanes AV1, AV2, . . . , AVm, that is of moving target areas, positioning proves to be more complex as it should take into consideration the particularities inherent to airplanes. Indeed, the latter consume more fuel in the climbing phase, less in the level flying phase and even less in the descent phase. Thus, the distribution of groups G of balloon stations around mean lanes of airplanes will be somewhat different, with more supply balloon stations in the climbing lanes of airplanes, less in the flying level area and even less in the descent lanes. The densities of balloon stations are uniform in each target area Z, but in each one of them, the densities d are different according to the hereinafter mentioned relationship $d_{climbing} > d_{flying\ level} > d_{descent}$.

It can be seen on FIG. 1, that three balloon stations 2A, 2B, 2C are shown amongst the n balloon stations that a group G can comprise, and that they are located at altitudes close to but different from each other, in a three-dimensional space. And the number of tanker drones 7 they carry, could be any one, whether identical or not (three are shown per station). Furthermore, in case of need, one of the balloon stations of a group having the excess resource of liquid hydrogen could migrate to a group lacking resource for meeting the demand.

To this end, a computer system (not shown) manages the global distribution system 1 so as to optimize the resource, that is the liquefied hydrogen to be produced and can then be advantageously inserted into the management software for the air path for there too optimizing the journeys of airplanes, the respective positioning of balloon stations and the choice of supplying drones as a function of the current conditions, of the recent past and of the short term predictable traffic.

Furthermore, it is known that it is imperative that the balloon stations 2A, 2B, 2C, . . . , 2n, for example within one single group, remain not only in the environment of a stationary point with respect to the ground so as to avoid that one of them moves apart from the group, but also in relatively stable configuration from each other so as to prevent one of them from getting too close to another. (These considerations only relate to free or autonomous balloon stations, as those referred to as captive are connected to the ground by links <<setting>> their position). For a given target area Z, once the density of balloon stations is defined, the relative positioning in the imparted volume should guarantee the density that has been specified.

To this end, as shown on FIG. 3 only bringing in relation two balloon stations for clarity reasons, for example the stations 2A, 2B, each balloon station comprises a computer 15 to which a sensor and actuator piloting and guiding equipment 16 is connected, so as to be able to act on the move of the balloon station. The computers 15 communicate, on the one hand, therebetween and, on the other hand, with their corresponding piloting and guiding equipment 16 through respective links 17 and 18 via radiofrequency and/or optically (laser).

Of course, the defect of a computer could not be prevented and, advantageously, instead of providing an additional computer in each balloon station and thereby achieve an internal operational redundancy, each computer 15 is of the master-slave type. Thus, if the computer 15 of the balloon station 2A breaks down, the computer 15 of the other balloon station 2B could take over without endangering the system. For ensuring reading the data provided by the equipment 16 of the balloon station 2A by the computer 15 of the balloon station 2B and vice versa, a voting unit 20 is used being in communication via radiofrequency and/or optical links 21 with the computers 15 of the balloon stations, so as to trigger remotely. Switching between the computers 15 occurs by the voting unit 20 that, for example, should the computer 15 of the station 2A be defective, inhibits the data from the latter to the equipment 16 while letting the data from the computer 15 of the station 2B go through.

Thus, such an arrangement of master-slave computers 15 and of voting units 20 provides an intrinsic redundancy external to each group G of balloon stations providing an optimum operational reliability. Each computer 15 has further the computing ability being at least sufficient for that needed for managing a group or a constellation of balloon stations.

As far as the telecommunications network is concerned between the n balloon stations 2A, 2B, 2C, 2 ..., 2n located on top of a movable or stationary target area Z, it could be illustrated as shown on FIG. 4. These balloon stations are schematically shown as a rectangle and, of course, the telecommunications network they form is three-dimensional and should be permanently maintained between the latter, because, more specifically, the winds could vary the geometry of the group or of the constellation of the n balloon stations. Consequently, it is appropriate to ensure that the communications graph formed by these permanently linked balloon stations, that is, that any two of said balloon stations communicate therebetween directly or indirectly via intermediary balloon stations as in the illustrated example. This connection characteristic results from the topology of the communications graph and it is appropriate to ensure, from the standpoint of piloting and guiding performance of balloon stations, that the maximum tolerated geometric changes do not impair the topologic character of the connected graph being targeted.

An appropriate software is provided for managing real time connections and ensuring the connectivity of the communications graph. It is also noticed that the intrinsic reliability of such a system is not that of a system of redundancies of 1 amongst n, but it depends on the configuration of the graph at a given instant. The techniques for optimizing telecom networks developed in the theory of graphs for checking the resilience of a network are then here definitely applicable and could use, if appropriate, Menger's theorems. A significant novelty is therefore achieved, in so far as the system has an intrinsic reliability as a function of time, the variation depending on the topologic variation of the graph, which one depends on the geometric variation of the group.

With the system of the present method, system and device, the balloon stations could also be provided with telecommunications equipment for the airplanes flying in the vicinity of appropriately distributed groups of balloon stations. For example, relays with the ground or between airplanes and other services could be contemplated as the diffusion of television channels, games, mobile telephone telecommunications with passengers, relays with satellites, etc.

The invention claimed is:

1. An aerial system for producing and distributing liquid hydrogen, comprising:
    at least one high-altitude balloon station comprising a balloon and a water supply for use in making liquid hydrogen;
    equipment located on-board the at least one balloon station configured to convert the water supply into liquid hydrogen using solar radiation; and
    at least one controllable drone having a fluid storage tank;
    wherein the at least one drone is configured to receive liquid hydrogen from the at least one balloon station into the tank and to deliver liquid hydrogen to at least one target configured to be refueled or configured to store liquid hydrogen.

2. The system according to claim 1, wherein the at least one balloon station comprises a platform configured to carry the at least one controllable drone.

3. The system according to claim 1, wherein the balloon of the at least one balloon station comprises an adjustable gas volume and is configured to climb in altitude, to descend in altitude, and to level off at selected altitudes through the adjustment of the variable gas volume.

4. The system according to claim 1, wherein the at least one balloon station is captive and connected to the ground via at least one controllable link.

5. The system according to claim 4, wherein each of the at least one controllable link comprises at least two cables assembled in series; wherein each of the at least one link is connected to the ground at one end and to one of the at least one balloon station at the other end; and wherein each of the at least one link comprises at least one auxiliary balloon configured to support the weight of the link.

6. The system according to claim 4, wherein pipes configured to supply water to said water supplies from the ground using steam pressure are associated with the at least one link connecting the at least one balloon station to the ground.

7. The system according to claim 1, wherein the at least one balloon station further comprises a computer and piloting-guiding equipment; wherein the at least one balloon station is autonomously controlled by said computer.

8. The system according to claim 7, wherein the at least one balloon station comprises a plurality of balloon stations forming a high-altitude network above the ground; wherein the network is composed of individual groupings of at least one balloon station each; wherein the individual groupings produce and supply liquid hydrogen for individual targets in the at least one target; wherein the computers of each of the balloon stations are in communication with one another; and wherein each balloon station is configured to leave a group, migrate to, and join another in response to computer communications.

9. The system according to claim 1, wherein the target configured to be refueled is an aircraft in flight or another balloon station; and wherein the target configured to store liquid hydrogen is a fluid tank on the ground.

10. The system according to claim 8, wherein the computers of the plurality of balloon stations operate in master-slave relationships; and wherein in the event the computer of one of the balloon stations fails, the operation of the failed computer is assumed by an operational computer of any other balloon station.

11. The system according to claim 10, further comprising at least one voting unit in communication with the balloon stations; wherein the at least one voting unit is triggered remotely in the event of a failed computer; and wherein the at least one voting unit causes one of the operational computers to assume operations for the failed computer, prevents data provided by the defective computer from passing to corresponding on-board equipment, and allows data from the at least one operational computer to pass through.

12. The system according to claim 11, wherein said computers communicate with each other and with said respective equipment via radiofrequency or via laser transmission; and wherein said at least one voting unit communicates with said balloon stations via radiofrequency or via laser transmission.

13. A method for producing and distributing liquid hydrogen, comprising:
    providing at least one balloon station, the at least one station comprising a balloon and a water supply for use in making liquid hydrogen;
    providing equipment configured to convert the water supply into liquid hydrogen on-board the at least one balloon station;
    placing the balloon station at a high-altitude above the ground;
    using the equipment to convert the water supply into liquid hydrogen using solar radiation;
    providing at least one controllable drone having a fluid storage tank;

transferring liquid hydrogen from the at least one balloon station to the at least one controllable drone; and distributing the liquid hydrogen from the at least one balloon station to at least one target configured to be refueled or configured to store liquid hydrogen, using the at least one controllable drone.

14. The method of claim 13, wherein the at least one balloon station further comprises a platform configured to carry the at least one controllable drone.

15. The method of claim 13, wherein the at least one balloon station further comprises a computer and piloting-guiding equipment; and wherein the at least one balloon station is autonomously controlled by said computer.

16. The method of claim 13, further comprising: providing at least one controllable link to captively connect the at least one balloon station to the ground.

17. The method of claim 16, wherein each of the at least one controllable link further comprises at least two cables assembled in series; wherein each of the at least one link is connected to the ground at one end and to one of the at least one balloon station at the other end; and wherein each of the at least one link further comprises at least one auxiliary balloon configured to support the weight of the link.

18. The method of claim 15, further comprising:
providing a plurality of the balloon stations, equipment, and controllable drones;
forming a high-altitude network of the balloon stations, equipment, and drones above the ground;
wherein the network is composed of individual groupings of at least one balloon station each in communication with each other;
producing liquid hydrogen at each of the individual groupings of balloon stations;
distributing the liquid hydrogen from each of the individual groupings of balloon stations to a plurality of the targets configured to be refueled or configured to store liquid hydrogen;
wherein the computers of each of the balloon stations are in communication with one another; and
wherein each balloon station is configured to leave a group, migrate to, and join another group in response to computer communications.

19. The method of claim 18, further comprising:
providing at least one voting unit in communication with the balloon stations;
remotely triggering the at least one voting unit in the event of the computer on one of the balloon stations failing;
commanding one of the operational computers on another balloon station to assume operations for the failed computer via the at least one voting unit;
preventing data provided by the defective computer from passing to corresponding on-board equipment via the at least on voting unit; and
allowing data from the at least one operational computer to pass through to the on-board equipment of the balloon station having a failed computer via the at least one voting unit.

20. The method of claim 18, further comprising:
controlling at least one drone to return to at least one balloon station after the distribution of liquid hydrogen to the at least one target.

* * * * *